United States Patent
Guo et al.

(10) Patent No.: US 8,897,548 B2
(45) Date of Patent: Nov. 25, 2014

(54) LOW-COMPLEXITY METHOD OF CONVERTING IMAGE/VIDEO INTO 3D FROM 2D

(71) Applicant: National Chung Cheng University, Chia-Yi County (TW)

(72) Inventors: Jiun-In Guo, Chia-Yi County (TW); Jui-Sheng Lee, Chia-Yi County (TW); Cheng-An Chien, Chia-Yi County (TW); Jia-Hou Chang, Chia-Yi County (TW); Cheng-Yen Chang, Chia-Yi County (TW)

(73) Assignee: National Chung Cheng University, Chia-Yi County (TW)

( * ) Notice: Subject to any disclaimer, the term of this patent is extended or adjusted under 35 U.S.C. 154(b) by 102 days.

(21) Appl. No.: 13/855,323

(22) Filed: Apr. 2, 2013

(65) Prior Publication Data

US 2014/0294287 A1    Oct. 2, 2014

(51) Int. Cl.
| | |
|---|---|
| *G06K 9/00* | (2006.01) |
| *G06T 19/20* | (2011.01) |
| *G06T 5/00* | (2006.01) |
| *G06T 7/00* | (2006.01) |

(52) U.S. Cl.
CPC ............ *G06T 19/20* (2013.01); *G06K 9/00248* (2013.01); *G06K 9/00362* (2013.01); *G06T 5/001* (2013.01); *G06T 7/0081* (2013.01); *G06T 7/0083* (2013.01)

USPC .......................................................... 382/154

(58) Field of Classification Search
None
See application file for complete search history.

(56) References Cited

U.S. PATENT DOCUMENTS

| | | | |
|---|---|---|---|
| 2012/0235988 A1* | 9/2012 | Karafin et al. ................. | 345/419 |
| 2014/0118504 A1* | 5/2014 | Shima et al. .................... | 348/47 |
| 2014/0145930 A1* | 5/2014 | Mandella et al. .............. | 345/156 |
| 2014/0176672 A1* | 6/2014 | Lu et al. ........................... | 348/43 |
| 2014/0204003 A1* | 7/2014 | Deering et al. .................... | 345/8 |
| 2014/0233803 A1* | 8/2014 | Golan et al. ................... | 382/103 |

* cited by examiner

*Primary Examiner* — Vikkram Bali
(74) *Attorney, Agent, or Firm* — Muncy, Geissler, Olds & Lowe, P.C.

(57) ABSTRACT

A low-complexity method of converting 2D images/videos into 3D ones includes the steps of identifying whether each pixel in one of the frames is an edge feature point; locating at least two vanishing lines in the frame according to the edge feature point; categorizing the frame into the one of close-up photographic feature, of landscape feature, and of vanishing-area feature; if the frame is identified to have the vanishing-area feature or the landscape feature to generate a GDM; and apply a modificatory procedure to the GDM to generate a final depth information map; if the frame is identified to have the close-up photographic feature, distinguish between a foreground object and a background information in the frame and define the depth of field to generate the final depth information map.

9 Claims, 8 Drawing Sheets

LOW-COMPLEXITY METHOD OF CONVERTING IMAGE/VIDEO INTO 3D FROM 2D

BACKGROUND OF THE INVENTION

1. Field of the Invention

The present invention relates generally to image processing technology, and more particularly, to a low-complexity method of converting two-dimension (2D) images/videos into three-dimension (3D) ones.

2. Description of the Related Art

The greatest difference between the 2D image/video and the 3D image/video lies in the availability of depth information map containing the relative distances between all of the objects in the 2D image/video and the spectator or photographer, so the depth information map is very crucial to the playback effect of the 3D stereoscopic display technology.

The conventional method of generation of image/video depth map includes two types. One is to take a photo of the same scene by a multi-lens camera to get two 2D images/videos and more and then to figure out a depth information map based on frame disparity. The other is to generate a depth information map based on the image/video taken by a general camera; however, the general camera can only photograph 2D frames at single angle of view, so it is highly complex to figure out depth of field based on one 2D image/video at single angle of view. For example, a thesis titled "Depth Map Generation by Image Classification" published by Battiato Sebastiano in 2004 discloses some similar methods—image classification, vanishing point detection, and mean-shift segmentation. Such methods need very high calculative complexity. For example, a thesis "Mean Shift Analysis and applications" published by Dorin Comaniciu mentions the mean-shift calculation in need of integral, exponential, and logarithmic calculations. In light of this, it is very difficult to immediately apply the conventional technology in this field in practice.

SUMMARY OF THE INVENTION

The primary objective of the present invention is to provide a low-complexity method of converting 2D images/videos into 3D ones, which can generate depth information that the 2D images/videos does not have by low-complexity image analytic and processing technology and further covert the 2D images/videos into 3D ones.

The secondary objective of the present invention is to provide a low-complexity method of converting 2D images/videos into 3D ones, which can greatly decrease calculational complexity to further suitably allow hardware or embedded system software to generate immediate stereoscopic images/videos and to maintain good quality of 3D images/videos.

The foregoing objectives of the present invention are attained by the method, which applies conversion to each frame of one image/video and includes the steps of a) identifying whether each pixel in one of the frames is an edge feature point; b) calculating each pixel, which is the edge feature point and centered, by locating adjacent pixels, which are also the edge feature points, around the centered pixel, saving data of straight lines connected between the adjacent pixels and the centered pixel separately, prioritizing the data of the straight lines according to the numbers of the edge feature points that the straight lines pass through, and finally defining the at least two straight lines passing through the most edge feature points in number as vanishing lines; c) identifying whether the density of the edge feature points in the frame is larger than a density threshold and identifying whether the number of the vanishing line in the frame is larger than a number threshold; if both are larger than the respective thresholds, it will be identified that the frame is of close-up photographic feature; then calculate the ratio of sky to faraway mountain in the frame according to color; if the ratio is larger than a landscape threshold, it will be identified that the frame is of landscape feature; if the frame is neither identified to be the close-up photographic feature nor the landscape feature, it will be identified that the frame is of vanishing-area feature; d) locating the vanishing area and generating a gradient depth map (GDM); if the frame is identified to have the vanishing-area feature in the step c), locate the vanishing area in the frame by vanishing-area detective technology, which is to locate the area where vanishing points, which are crossing points of all vanishing lines, are the densest and defining the area as vanishing area; if the vanishing area is located outside the frame, set the border of the frame, which matches the tendency of the vanishing lines the most, as the vanishing area; if the frame is identified to be of the landscape feature, it will be defined that the vanishing area is located at the upmost side of the frame; next, generate a GDM based on the distance between each pixel and the vanishing area in the frame and then apply a modificatory procedure to the GDM to further generate a final depth information map; and e) if the frame is identified to be of the close-up photographic feature in the step c), apply a pixel-based low-pass filtering to the frame distinguish between a foreground object and a background information and define the depth of the foreground object as the closest depth of field and define the depth of the background information as the farthermost depth of field to generate the final depth information map.

DETAILED DESCRIPTION OF PREFERRED EMBODIMENTS

Figure 1:
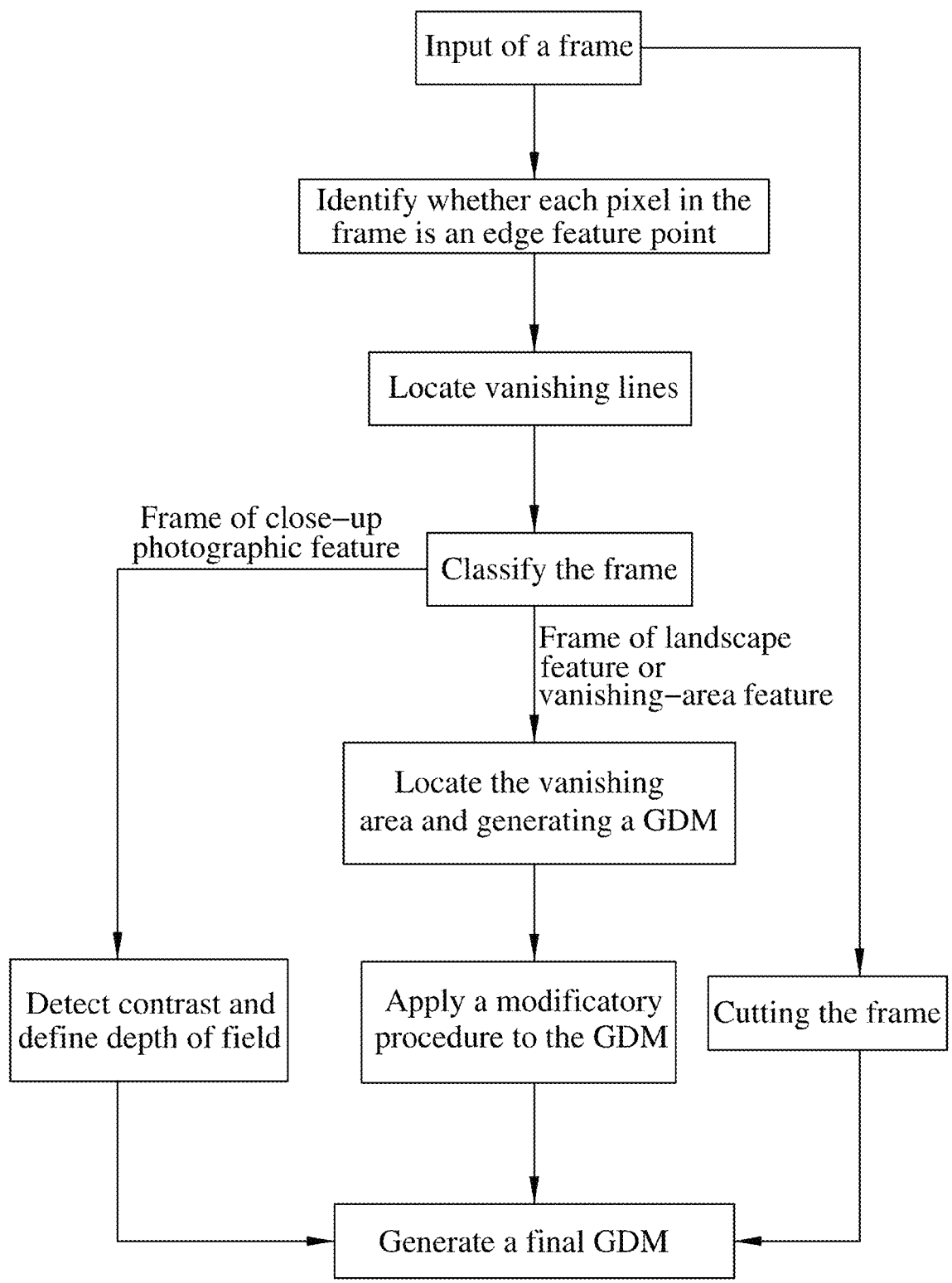
FIG. 1 is a flow chart of a preferred embodiment of the present invention.

To recite the technical features of the present invention, the following preferred embodiment is presented with accompanying drawings. The present invention belongs to image processing technology and it is difficult to illustrate the depth of field and image difference by mechanical drawing, so they are illustrated by images as shown in the drawings.

Figure 2:
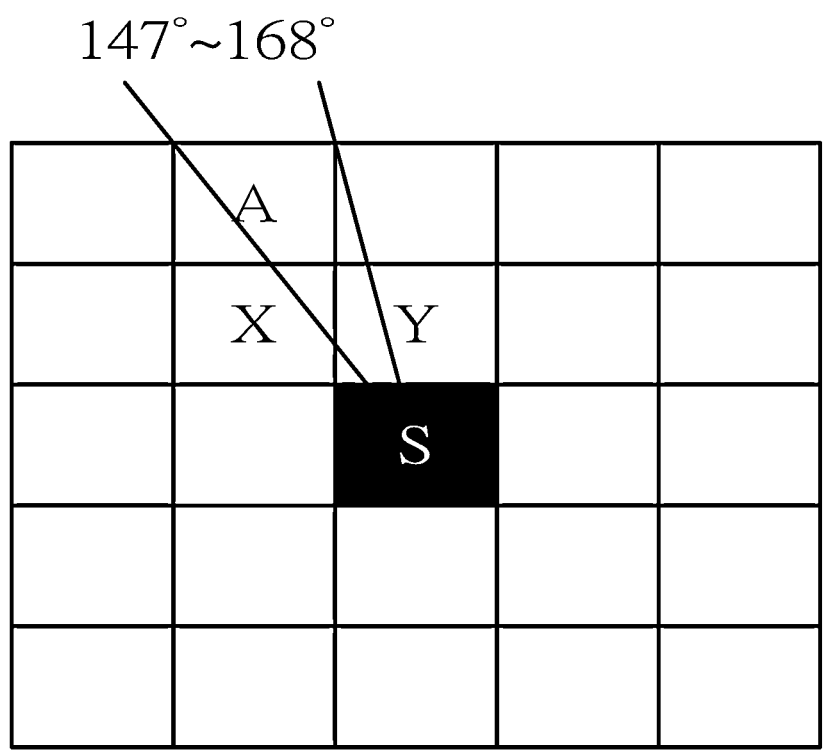
FIG. 2 is a schematic view of the preferred embodiment of the present invention, illustrating that the vanishing line is located.
Figure 3:
FIG. 3(A) is an exemplary image of the preferred embodiment of the present invention, illustrating a frame is of the vanishing area feature.
FIG. 3(B) is another exemplary image of the preferred embodiment of the present invention, illustrating that a frame is of the landscape feature.
FIG. 3(C) is an exemplary image of the preferred embodiment of the present invention, illustrating that a frame is of the close-up photographic feature.
Figure 3:
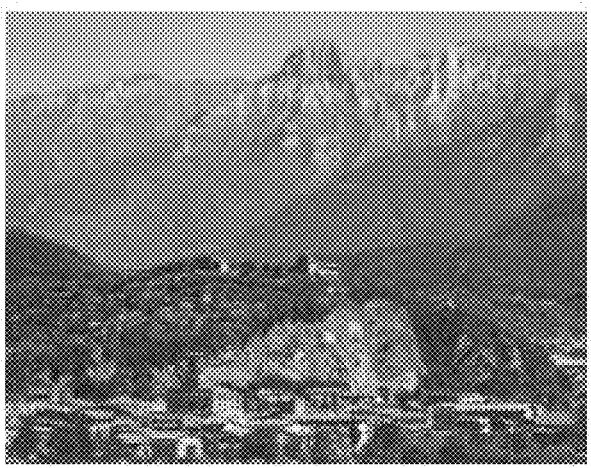
Figure 3:
Figure 4:
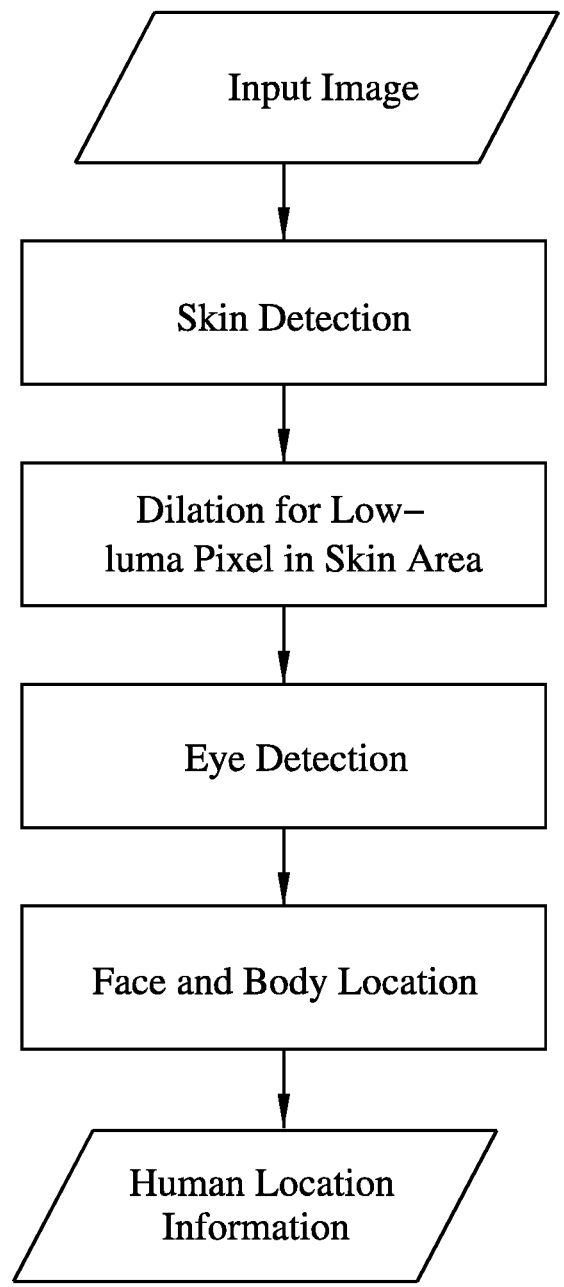
FIG. 4 is another flow chart of the preferred embodiment of the present invention, illustrating a flow chart of human detection.
Figure 5:
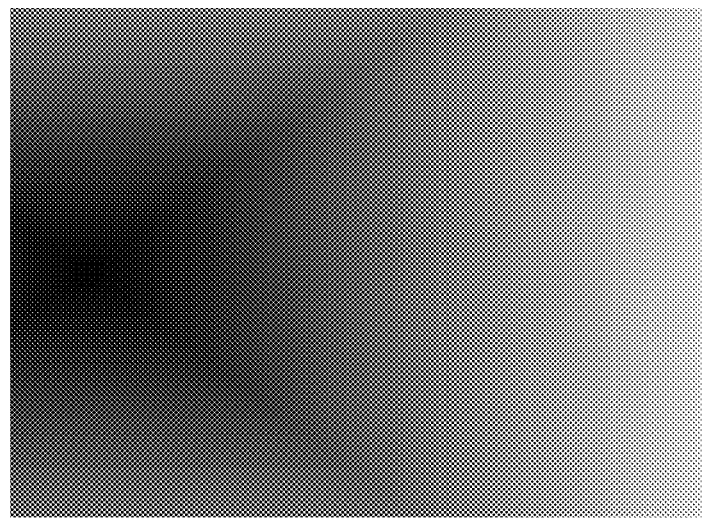
FIG. 5(A) is a schematic view of the preferred embodiment of the present invention, illustrating the GDM of the vanishing-area feature.
FIG. 5(B) is another schematic view of the preferred embodiment of the present invention, illustrating the GDM of the landscape feature.
Figure 5:
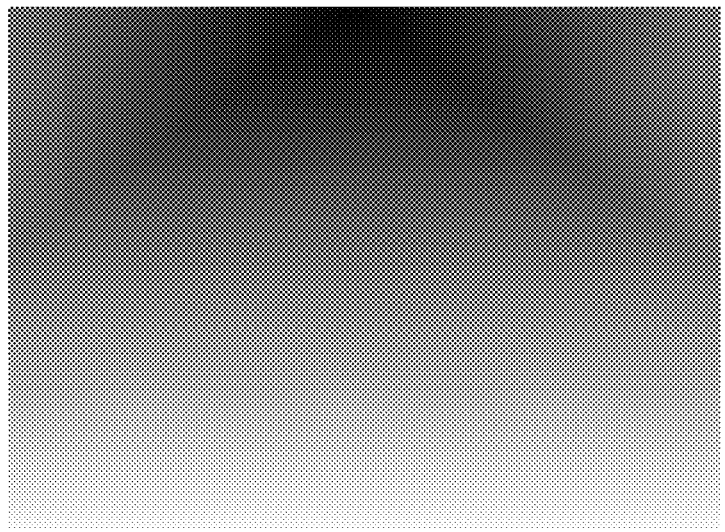
Figure 6:
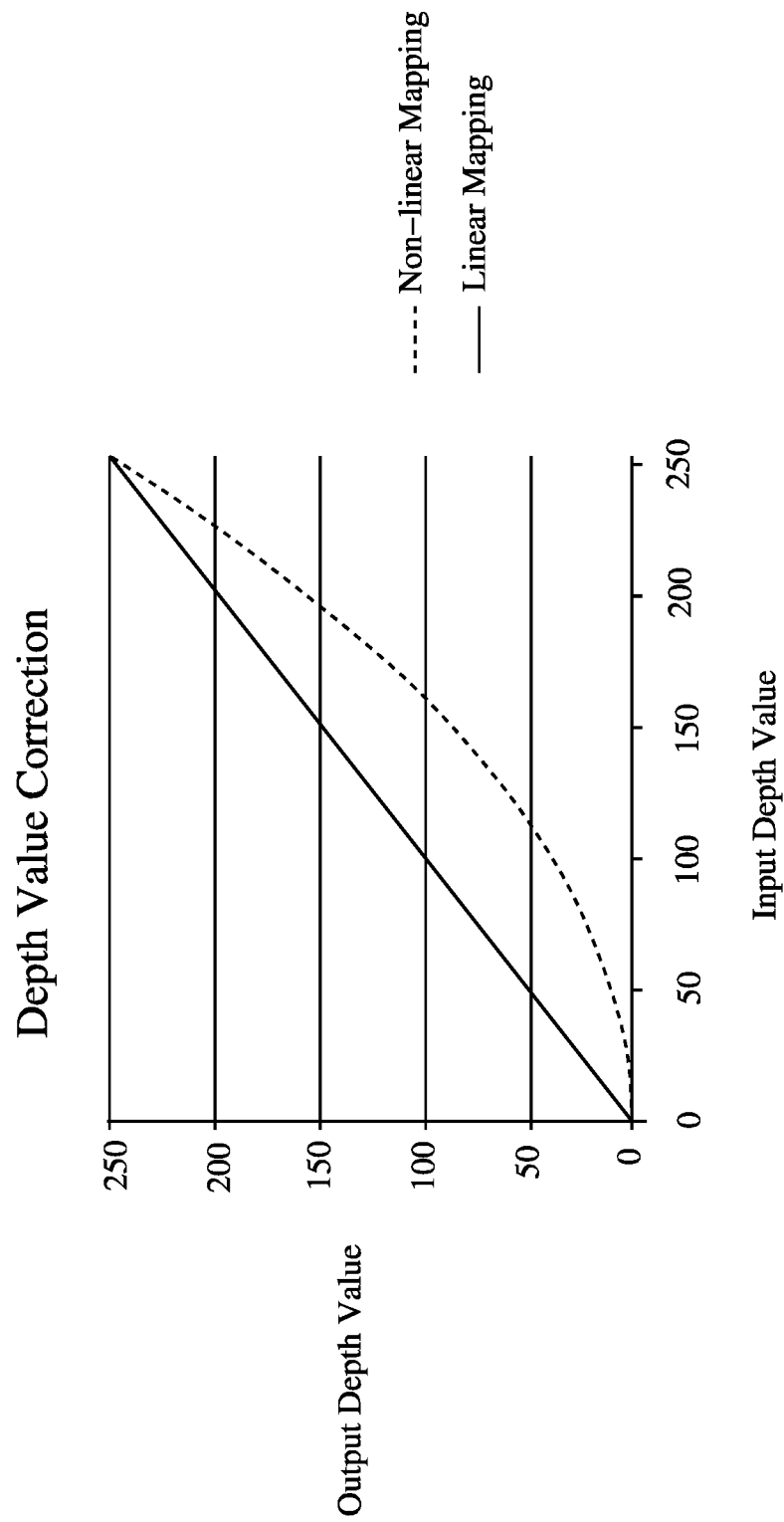
FIG. 6 is a schematic of the preferred embodiment of the present invention, illustrating an example of gamma correction function.
Figure 7:
FIG. 7(A) is a schematic view of the preferred embodiment of the present invention, illustrating the final depth information map of the vanishing-area feature.
FIG. 7(B) is a schematic view of the preferred embodiment of the present invention, illustrating the final depth information map of the landscape feature.
FIG. 7(C) is a schematic view of the preferred embodiment of the present invention, illustrating the final depth information map of the close-up photographic feature.
Figure 7:
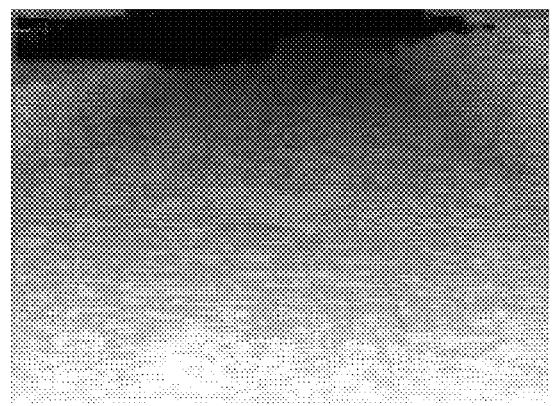
Figure 7:
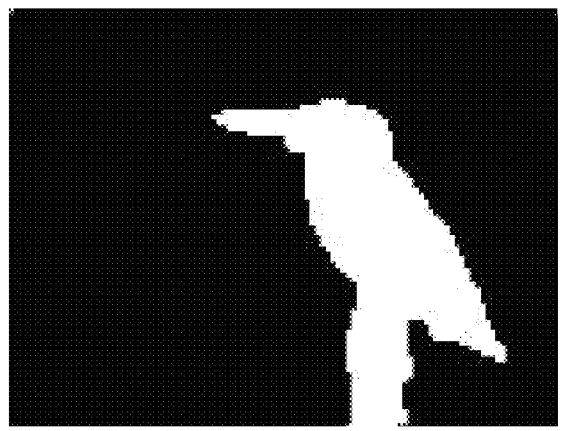

Referring to FIGS. 1-8, a low-complexity method of converting 2D images/videos into 3D ones in accordance with a preferred embodiment of the present invention is applied to each frame of one image/video and composed of the following steps.

a) Identify whether each pixel in one frame is an edge feature point. Specifically, in this embodiment. Sobel mask filtering is employed for identifying whether each pixel in the frame is the edge feature point; namely, get a horizontal value and a vertical value with a mean value of one of the pixel and its ambient eight pixels in ROB format or the Y value of YUV format through a mask array in vertical and horizontal directions; sum up the absolute value of the horizontal value and that of the vertical value; and then compare the sum with an edge threshold. If the sum is larger than the edge threshold, it will be identified that the pixel belongs to the edge feature point. Although a conventional calculational method is to figure out the square root of sum of squares of the horizontal and vertical values, such calculation method is highly complex, so the calculational method of the present invention can greatly simplify the complexity of the conventional one about 65% and maintain almost the same result as that of the conventional calculational method.

b) Carry out calculation of each pixel, which is the edge feature point and centered. Specifically, locate other pixels, which are also the edge feature points, around the centered pixel; save data of straight lines connected between the adjacent pixels and the centered pixel separately; prioritize the data of the straight lines according to the number that each of the straight lines passes through the edge feature points, and define two straight lines passing through the most edge feature points in number as vanishing lines. In this embodiment, as shown in FIG. 2, the adjacent pixels indicate eight pixels around the centered pixel and 16 pixels around the eight pixels; 5×5 Block Hough Transform is taken to locate the vanishing lines. In actual operation, referring to FIG. 2 as an illustrative example, the black spot S in FIG. 2 is a pixel currently processed and an edge feature point; first, locate whether there is any edge feature point in the white area A and then locate whether there is any edge feature point in the gray areas X and Y. In FIG. 2, all of the areas A, X, and Y have edge feature points and meanwhile, figure out the data of the straight lines from 147 degrees to 168 degrees at the black spot S via the Hough Transform and then record the data. Compared with the non-simplified Hough Transform, such approach can decrease the calculational complexity for 56%.

c) Identify whether the density of the edge feature points in the frame is larger than a density threshold and identify whether the number of the vanishing lines in the frame is larger than a number threshold. If both are larger than the respective thresholds, it will be identified that the frame is of close-up photographic feature, as shown in FIG. 3(C). Next, calculate the ratio of sky to faraway mountain in the frame by color. If the ratio is larger than a landscape threshold, it will be identified that the frame is of landscape feature, as shown in FIG. 3(B). If the frame is neither identified to be of close-up photographic feature nor the landscape feature, it will be identified that the frame is of vanishing-area feature, as shown in FIG. 3A.

d) If the frame is identified to be of the vanishing-area feature, locate the vanishing area of the frame by the vanishing-area detective technology, which is to locate the area where vanishing points, which are crossing points of all vanishing lines, are the densest within a 8×8 block pixel and defining the area as vanishing area; if the vanishing area is located outside the frame, set the border of the frame, which matches the tendency of the vanishing lines the most, as the vanishing area; if the frame is identified to be of the landscape feature, it will be defined that the vanishing area is located at the upmost side of the frame. Initially constitute the depth-of-field information structure of the whole frame according to features of the vanishing area and then acquire the depth-of-field information of each object via objection detection or human detection. The human detection, as shown in FIG. 4, is to identify the block belonging to the skin in the image/video, intensify the skin block having lower brightness, find out locations of the two eyes on the face, and define the location of the whole character according to location dependency of human face and human body to further infer the depth-of-field information. Next, generate a GDM based on the distance between each pixel and the vanishing area in the frame. What FIG. 5(A) presents corresponds to the GDM shown in FIG. 3(A), and what FIG. 5(B) presents corresponds to the GDM shown in FIG. 3(B). The farthest scene in the frame of the landscape feature mostly falls on the topmost side of the frame and the image texture is smoother not complex, such as sky or faraway mountain, so the vanishing area of the frame of the landscape feature can located at the topmost side of the GDM, as shown in FIG. 3(B) and FIG. 5(B). Distant objects can be located via low-pass preprocessing and thus the distant depth of field can be set to be the farthest.

As known above, the aforesaid Sobel mask filtering, human detection, or object detection can help adjust the GDM to uniform the depth value of the same object in the frame in the depth map.

Next, apply a modificatory procedure to the GDM to further generate a final depth information map. The modificatory procedure in this embodiment can be done by the following two methods. One of the two methods is to carry out predetermined calculation of the GDM according to the edge feature point of the frame to reinforce the edges of the objects in the frame, referring to a joint bilateral filtering (JBF) without edge stop function. The conventional JBF though can detect edge by the edge stop function, but the present invention does not need such function for detecting edge, so the present invention can reduce the calculational complexity for 26%. The other method refers to depth value gamma correction—adjust the distribution of the whole depth value of the depth map via gamma correction function shown in FIG. 6—to further make the distant object become farther and make the close-up object become closer as the human eyes can perceive in such a way that the human eyes can perceive more genuine 3D image/video in stereopsis. The final depth information maps of the frames of the vanishing-area feature and the landscape feature are shown in FIG. 7(A) and FIG. 7(B) separately.

Figure 8:
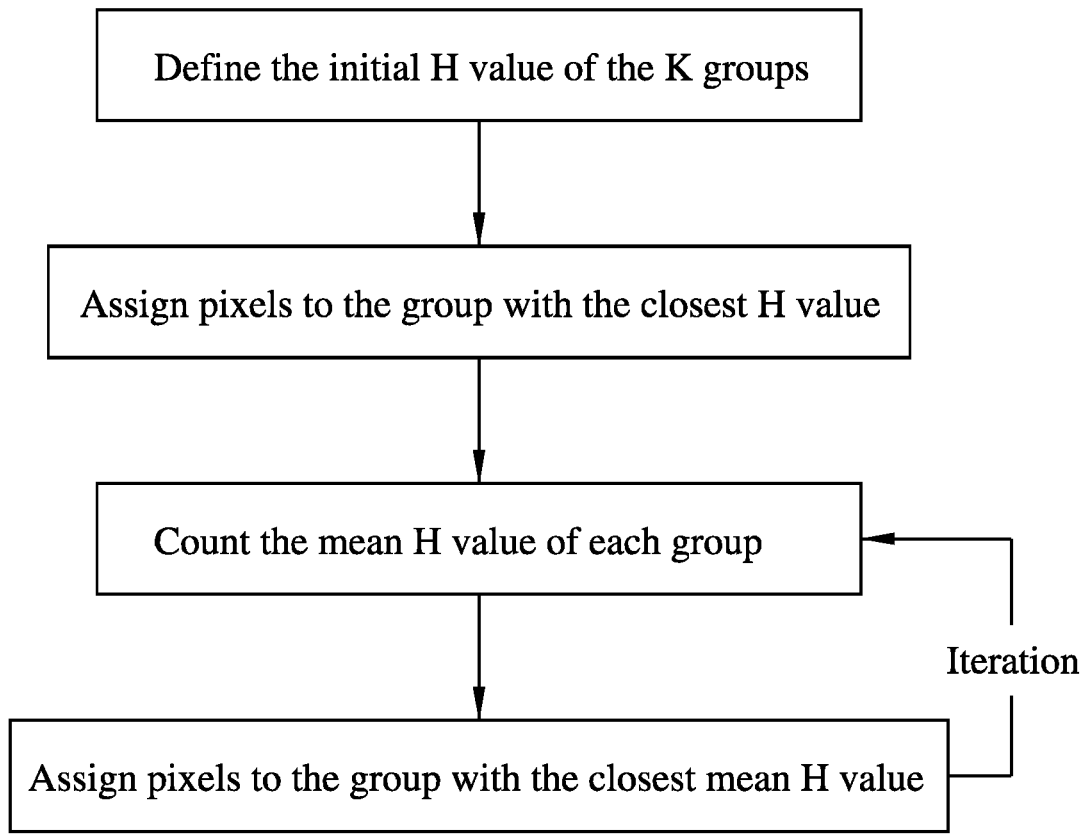
FIG. 8 is another flow chart of the preferred embodiment of the present invention, illustrating a flow chart of K-mean segmentation.

In this embodiment, a sub-step d1) is further included after the step d) as recited below.

d1) Cut the frame by a cutting method. Combine the pixel groups of similar color. Define that each group has an initial value. Apply cutting to the frame to detect objects. And then adjust the GDM according to the cutting outcome to enable the depth value of the same object to be consistent in depth information. The aforesaid cutting method is a K-means segmentation, as shown in FIG. 8, which is to classify the pixels according to degree of similarity between value of each pixel and the initial value of each group and after the classification, sum up and average all of the values of the pixels of the group to get a value in place of the original initial value of the group; next, it can be decided whether the pixels will be classified again. The aforesaid classification is called an iteration. After experiment, the best number of the iteration of the present invention is 5-8. The general cutting algorithm is mean-shift segmentation, which needs very high calculation. However, the K-means segmentation can not only do object segmentation but reduce the calculational complexity of the prior art for 50% approximately. The cutting method of the step d1) can be applied to frame before the step a) and after the GDM is generated at the step d), the GDM can be adjusted according to the cutting outcome.

e) If the frame in the step c) is identified to be of close-up photographic feature, apply a pixel-based low-pass filtering to the frame to distinguish between a foreground object and a background information and define that the foreground object is of the closest depth of field and the background information is of the farthest depth of field to further generate a final depth information map. The final depth information map of the frame of the close-up photographic feature is shown in FIG. 7(C).

In light of the above steps, the present invention can simplify many calculational methods to further greatly reduce the calculational complexity. Therefore, the present invention can generate the depth information that is not available in the 2D image/video by means of the low-complexity image analytic and processing technology to further convert the 2D images/videos into 3D ones.

In addition, the present invention can greatly decrease the calculational complexity to further suitably allow hardware or embedded system software to generate immediate stereoscopic images/videos and to maintain good quality of 3D images/videos.

Although the present invention has been described with respect to a specific preferred embodiment thereof, it is in no way limited to the specifics of the illustrated structures but changes and modifications may be made within the scope of the appended claims.

What is claimed is:

1. A low-complexity method of converting 2D images/videos into 3D ones for converting frames of an image/video one by one, comprising steps of:
    a) identifying whether each pixel in a frame is an edge feature point;
    b) carrying out calculation for each pixel, which is the edge feature point and centered, by locating other pixels, which are also the edge feature points, around the centered pixel, saving data of straight lines connected between the adjacent pixels and the centered pixel separately, prioritizing the data of the straight lines according to the number that each of the straight lines passes through the edge feature points, and defining two straight lines passing through the most edge feature points in number as vanishing lines;
    c) identifying whether the density of the edge feature points in the frame is larger than a density threshold and whether the number of the vanishing lines in the frame is larger than a number threshold; if both are larger than the respective thresholds, it will be identified that the frame is of close-up photographic feature; and then calculating the ratio of sky to faraway mountain by color; if the ratio is larger than a landscape threshold, it will be identified that the frame is of landscape feature; if the frame is identified to be of neither the close-up photographic feature nor the landscape feature, it will be identified that the frame is of vanishing-area feature;
    d) locating the vanishing area of the frame by a vanishing-area detective technology, which is to locate the area where vanishing points that are crossing points of all vanishing lines are the densest in the frame and to define the area as a vanishing area, if the frame is identified to be of the vanishing-area feature; if the vanishing area is located outside the frame, set the border of the frame, which matches the tendency of the vanishing lines the most, as the vanishing area; if the frame is identified to be of the landscape feature, it will be defined that the vanishing area is located at the upmost side of the frame; next, generating a gradient depth map (GDM) based on the distance between each pixel and the vanishing area in the frame; and carrying out a modificatory procedure of the GDM to further generate a final depth information map; and
    e) applying pixel-based low-pass filtering to the frame, if the frame in the step c) is identified to be of close-up photographic feature, to distinguish between foreground object and a background information, defining that the foreground object is of the closest depth of field and the background information is of the farthest depth of field, and further generating a final depth information map.

2. The method as defined in claim 1, wherein the edge feature point in the step a) is identified via Sobel mask filtering comprising steps of getting a horizontal value and a vertical value with a mean value of one of the pixel and its ambient eight pixels in RGB format or the Y value of YUV format through a mask array in vertical and horizontal directions; then summing up the absolute value of the horizontal value and that of the vertical value; if the sum is larger than an edge threshold, it will be identified that the pixel is the edge feature point.

3. The method as defined in claim 1, wherein in the step b), the adjacent pixels indicate eight pixels around the centered pixel and 16 pixels around the eight pixels and the vanishing lines are located by 5×5 Block Hough Transform.

4. The method as defined in claim 1, wherein after the vanishing area is located, the step d) further comprises a sub-step of initially constituting a depth-of-field information structure of the whole frame according to features of the vanishing area and then acquiring the depth-of-field information of each object via objection detection or human detection where the human detection is to identify the block belonging to the skin in the image/video, intensify the skin block having lower brightness, find out locations of the two eyes on the face, and define the location of the whole character according to location dependency of human face and human body to further infer the depth-of-field information.

5. The method as defined in claim 1, wherein in the step d), if the frame is of landscape feature, distant objects can be located via low-pass preprocessing and thus the distant depth of field can be set to be the farthest.

6. The method as defined in claim 1, wherein in the step d), the vanishing-area detective technology is to locate the area where the vanishing points are the densest within an 8×8 block pixel in the frame and to define the area as a vanishing area.

7. The method as defined in claim 1, wherein the step d) further comprises a sub-step of applying a modificatory procedure to the GDM where the modificatory procedure can be done by one of two methods, one of which refers to the predetermined calculation is based on joint bilateral filtering (JBF) without edge stop function—carry out predetermined calculation of the GDM according to the edge feature point of the frame to reinforce the edges of the objects in the frame—and the other method refers to depth value gamma correction—adjust the distribution of the whole depth value of the depth map via gamma correction function—to further make the distant object become farther and make the close-up object become closer as the human eyes can perceive.

8. The method as defined in claim 1 further comprising a sub-step d1) of cutting the frame by a cutting method, combining the pixel groups of similar color, applying cutting to the frame to detect an object, and then adjusting the GDM according to the cutting outcome to enable the depth value of the same object to be consistent in depth information, after the step d) and before the step e).

9. The method as defined in claim 8, wherein in the sub-step d1), the cutting method is K-means segmentation, which can classify the pixels according to degree of similarity between value of each pixel and the initial value of each group and after the classification, sum up and average all of the values of the pixels of the group to get a value in place of the original initial value of the group; next, it can be decided whether the pixels will be classified again where the aforesaid classification is called an iteration and multiple iterations can be done.

* * * * *